United States Patent [19]

Kaiser et al.

[11] Patent Number: 4,942,606
[45] Date of Patent: Jul. 17, 1990

[54] COMPUTER WITH IMPROVED KEYBOARD PASSWORD FUNCTIONS

[75] Inventors: Roger A. Kaiser; James H. Nuckols; Theodore F. Emerson; Gary L. Brasher, all of Houston, Tex.

[73] Assignee: Compaq Computer Corporation, Del.

[21] Appl. No.: 307,404

[22] Filed: Feb. 7, 1989

[51] Int. Cl.$^5$ .............................................. H04L 9/32
[52] U.S. Cl. .......................................... 380/4; 380/25; 380/50; 340/825.31; 340/825.34
[58] Field of Search ...................... 364/200, 900, 231.5, 364/234, 234.1, 234.2, 234.3, 234.4, 237.9, 246.6, 246.8, 926.9–926.93, 940, 940.1, 940.6, 942.3, 942.6, 969, 969.2, 969.3, 969.4, 971.1; 380/3–5, 23–25, 50; 340/825.31, 825.34

[56] References Cited

U.S. PATENT DOCUMENTS

| | | | |
|---|---|---|---|
| 4,529,870 | 7/1985 | Chaum | 380/25 X |
| 4,536,647 | 8/1985 | Atalla et al. | 380/24 |
| 4,697,072 | 9/1987 | Kawana | 380/24 X |
| 4,882,752 | 11/1989 | Lindman et al. | 380/25 |
| 4,891,838 | 1/1990 | Faber | 380/25 |

Primary Examiner—Stephen C. Buczinski
Assistant Examiner—Bernarr Earl Gregory
Attorney, Agent, or Firm—Arnold, White & Durkee

[57] ABSTRACT

A computer having an improved keyboard/auxiliary device interface controller which supports the selective restriction of user interaction with the computer system, while maintaining the full internal functionality of the host/peripheral interface. A "password lock mode" of the improved controller prevents users from gaining unauthorized access to the computer system, but still application and operating system software can continue to issue commands to and receive responses from the otherwise disabled peripheral devices. The improved controller does not require modification to the conventional keyboard/auxiliary device hardware.

20 Claims, 6 Drawing Sheets

COMPUTER WITH IMPROVED KEYBOARD PASSWORD FUNCTIONS

BACKGROUND OF THE INVENTION

The present invention relates to digital computer systems, and more particularly relates to control of a computer input/output device.

A computer usually contains valuable, confidential or otherwise restricted information in its memory and/or external storage devices, so it is accordingly desirable to control access to this information to prevent unauthorized use. Such controlled access to computer data may be realized either by providing physical (hardware) means for preventing the use of I/O devices on a computer system, or by providing software means for restricting access, such as a routine that confirms a user's knowledge of a password before granting that user access to information contained in the computer system.

It is also necessary to restrict user input to a computer from a keyboard is when the computer is functioning as a "network server", coordinating communication between multiple computers, terminals and/or other devices by a local area network (LAN). When functioning as a network server, a computer is dedicated at the execution of network software, in order to provide efficient, uninterrupted service to numerous network devices. If the keyboard of a network server is not disabled when the network operator is not present, an unrestricted user could potentially gain access to normally restricted files, or cause network communication to be disrupted.

One commonly-used method for restricting user interaction with a computer is to provide a "password lock" function in the keyboard or auxiliary device controller which can prevent communication between the external devices and the computer. Typically, when a controller is in "password lock mode", no communication between external input devices and the computer is allowed unless a password is first entered to remove the controller from "password lock mode". One type of computer having this password lock function is the IBM PS/2 desktop models. If such a function is implemented in a peripheral device controller of a computer, however, it may prevent proper execution of software which requires communication with the locked-out external devices. For example, operating system software may require information about which devices are present in a computer system in order to determine the current system configuration. Other software that requires application-specific hardware, such as a "mouse", a digitizing tablet, or some other specialized data acquisition device, may not function properly if it cannot determine whether such devices are actually present in the system.

It is accordingly an object of present invention to provide improved functions for an auxiliary device controller, particularly a mode of operation which selectively allows or restricts communication between a computer and auxiliary devices. Another object is to provide an improved lock-out mode of operation for a computer, but nevertheless allow selected functions to be performed while in this lock-out mode.

Typically, the interface between the CPU of a computer and a peripheral I/O device is implemented using a standard controller or microprocessor device for the buffering, translation, or formatting of data as it is exchanged between the CPU and peripheral devices. One such controller device is a part number 8042, Universal Peripheral Interface 8-bit Slave Microcontroller, manufactured by Intel Corporation, Santa Clara, CA. This microprocessor or microcontroller includes a ROM or EPROM storage area (e.g., two-kilobyte) for holding customized machine language instruction routines that enable the controller to support various commands that it can receive from either the controlled device (i.e. a keyboard, a mouse or the like) or from the main computer processor (CPU). That is, in typical desk-top computers, the controller device (such as the 8042 device) is itself a processor, executing the machine language instructions to define a command sequence, although the same functions could be performed by a state machine or the like. Use of the 8042 type of device is much less costly and easier to design, however.

SUMMARY OF THE INVENTION

In a "password lock mode", as implemented in standard desk-top computers marketed today, a peripheral controller device (such as the 8042 type) does not allow any communication between the main processor and the controlled I/O devices. According to one embodiment of the present invention, however, the controller (via its ROM or EPROM code) is programmed to recognize certain commands and responses that should be allowed to pass between the main processor and a controlled device, even when the controller is in "password lock mode". Normal user input from the controlled devices is still restricted however, except for the case of these selected command/response sequences. In this way, a user is still prevented from gaining unauthorized access to files or from disrupting the operation of a network server, but software which requires communication with external devices can still operate properly.

Accordingly, an important feature of the invention is for a central processor to be able to communicate with "disabled" peripheral devices on a discriminate basis. That is, to distinguish between solicited and unsolicited responses when a peripheral device sends asynchronous streams of data. In the example embodiment, the peripheral device or controller is an 8042 device, but the feature is useful as well in systems employing peripheral circuitry constructed of logic using gate arrays or the like.

BRIEF DESCRIPTION OF THE DRAWINGS

The novel features characteristic of the invention are set forth in the appended claims. The invention itself, however, as well as other features and advantages thereof, will be best understood by reference to a detailed description of a specific embodiment, when read in conjunction with the accompanying drawings, wherein:

DETAILED DESCRIPTION OF SPECIFIC EMBODIMENT

Figure 1:
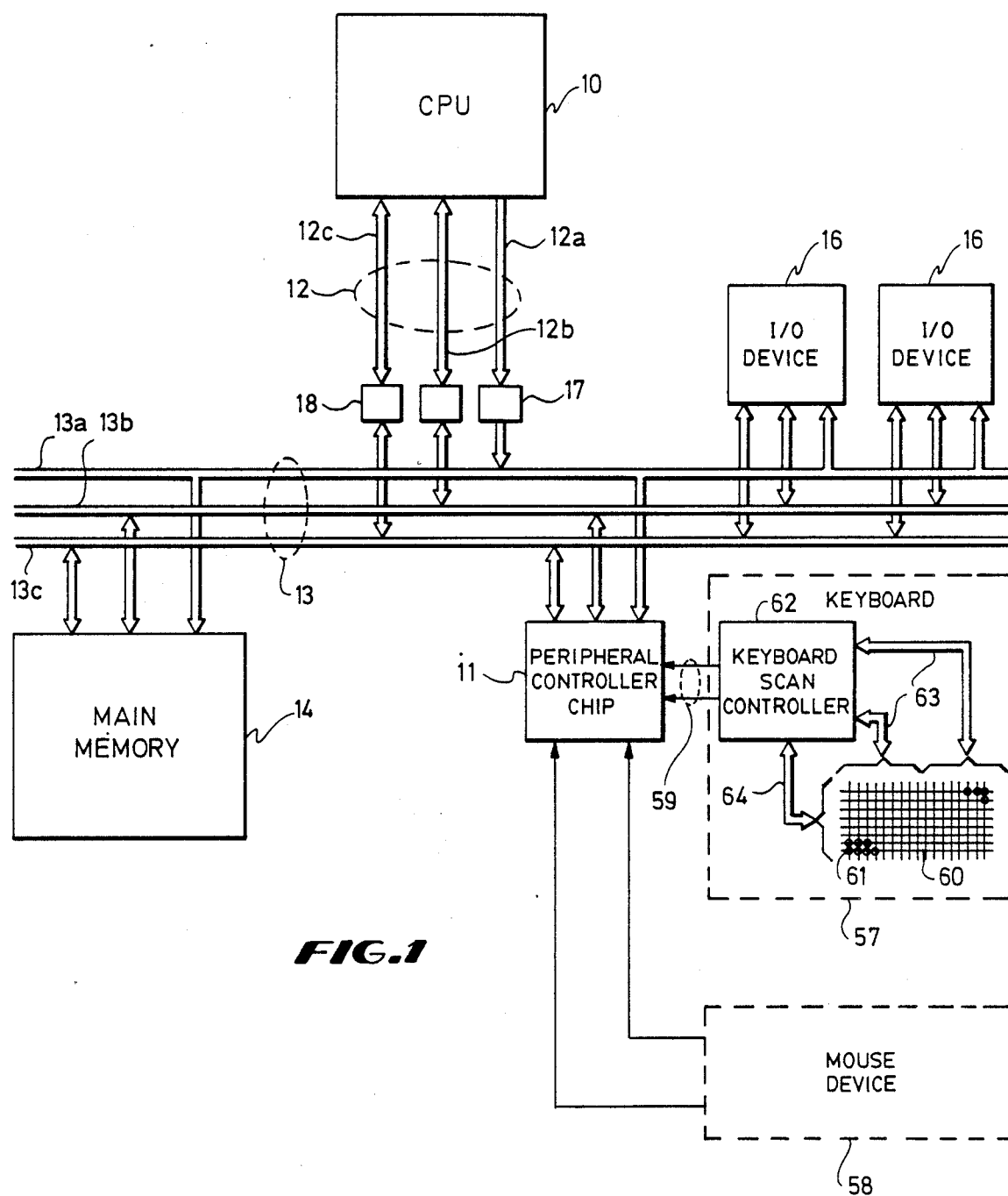
FIG. 1 is an electrical diagram in block form of a computer system which uses features of the invention.

Referring to FIG. 1, a digital computer system which may use features of the invention is illustrated. This system includes a CPU 10 which in a preferred embodiment in an Intel 80386 32-bit microprocessor, or an Intel 80386SX 32-bit microprocessor with 16-bit external data bus; according to the invention, a peripheral controller device 11 is used to interface the CPU with a keyboard or mouse. The microprocessor or CPU 10 is connected by a local bus 12 to a system bus 13 which logically connects the various components of the system, including the peripheral controller and CPU. If a 80386 CPU chip is used, the local bus 12 and the system bus 13 include thirty-two address lines 12a or 13a, thirty-two data lines 12b or 13b and a number of control lines 12c or 13c. On the other hand, if an 80386SX device is used, the address busses 12a and 13a are 24-bits, and the data busses 12b and 13b are 16-bits wide. Also present in the system is a main memory module 14 which is in a logical address space of 4-gigabytes for an 80386 or 16-Mbytes for an 80386SX, although usually about 1- or 2-Mbyte is physically present. The system also includes a plurality of other input/output (I/O) devices 16, such as video display devices, network adapters or modems, and disk drives, for providing facilities for user interaction with the system, or for providing additional bulk-storage facilities for the system. The busses 12 and 13 can be controlled by different devices, at the same time; the processor 10 can be accessing a cache controller or numeric coprocessor (not shown) on the local bus 12, while a disk drive operated by one of the controllers 16 is transferring data to the main memory 14 using DMA. Although an 80386 microprocessor is given as the preferred CPU device, it is understood that other microprocessor devices may make use of the features of the invention, such as Motorola's 68020 type devices, or later generations of 80386 or 68029 devices; the class of processor devices known as RISC microprocessors may also employ the concepts herein set forth.

The local bus 12 is separated from the system bus 13 by buffers or latches 17 for the addresses and data and a bus controller 18 for the control lines. In this manner, addresses and data are not applied to the system bus, even though present at the CPU output, unless the controller 18 has received the proper commands and has ownership of the system bus. Likewise, data on the system bus is not allowed onto the local CPU bus until the controller sees the proper commands from the CPU. In this manner, the CPU 10 can communicate with other devices on the local bus 12 without tying up the system bus 13.

Figure 2:
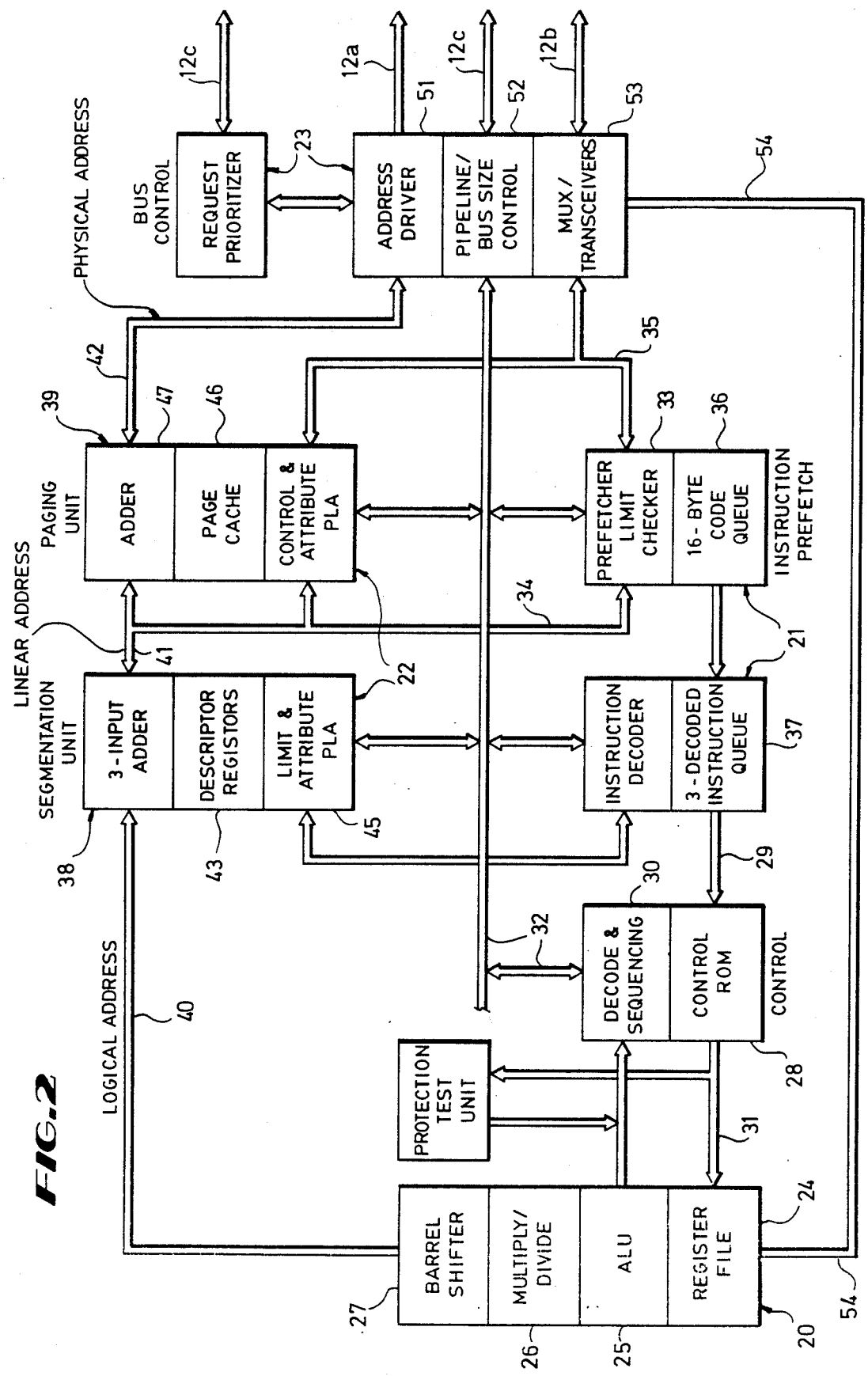
FIG. 2 is an electrical diagram in block form of the CPU of the system of FIG. 1.

Referring to FIG. 2, the CPU 10 of the 80386 or 80386SX type used in the illustrative embodiment is a high performance microprocessor including an on-chip memory management unit providing virtual memory support. The microprocessor is of the microcoded type, using "pipelining" or overlapped instruction execution, and generally includes an execution unit 20, an instruction unit 21, a memory management unit 22, and a bus interface unit 23. The internal data paths are 32-bit for either device, but the 80386SX has a 16-bit external data bus 12b while the 80386 has a 32-bit external data bus 12b.

The execution unit 20 performs arithmetic and logic operations on operands and addresses fetched from memory 14. The execution unit includes a register file 24 containing a number of general purpose 32-bit registers for holding operands, results or addresses, a 32-bit wide ALU 25 for performing the arithmetic or logic operation defined by an instruction, a multiply/divide circuit 26 for executing instructions using multiply or divide, and a barrel shifter 27 for executing 0-to-64 bit shifts on data inputted to the ALU. Microinstructions stored in a control ROM 28 define the operations performed in the execution unit. The microinstruction routines ae selected by an entry point derived from the current instruction and applied to an input 29, and the microcode sequence within a routine is determined by a sequencer 30, based upon a microaddress produced by the last microinstruction and conditions within the processor. Control signals produced by a microinstruction are applied to the execution unit 20 via bus 31, and to the other units of the CPU chip via internal control bus 32.

The instruction unit 21 functions to fetch and decode instructions of the instruction stream. A prefetch unit 33 outputs addresses via bus 34 through the memory management unit 22 to the external address bus 12a, and receives instructions back via external data bus 12b and bus 35, to fill an instruction queue 36 with the next sixteen bytes in the instruction stream, based upon an instruction pointer in the register file 24. An instruction consists of an opcode of one or two bytes, usually followed by one or more bytes of mode specifiers, address displacements and/or immediate data, so an instruction can be from one byte to six or eight or more bytes in length. A decode unit 37 receives instructions from the queue 36, decodes the opcods to generate entry point addresses for the control ROM 28, and determines what bytes are specifiers, displacements or immediate data and transfers the appropriate information to other units of the processor; this decode is three-deep, i.e., the next three decoded instructions are being processed at one time. This instruction unit is where the I/O instructions used to access the peripheral controller 11 are recognized upon being initially decoded.

Figure 3:
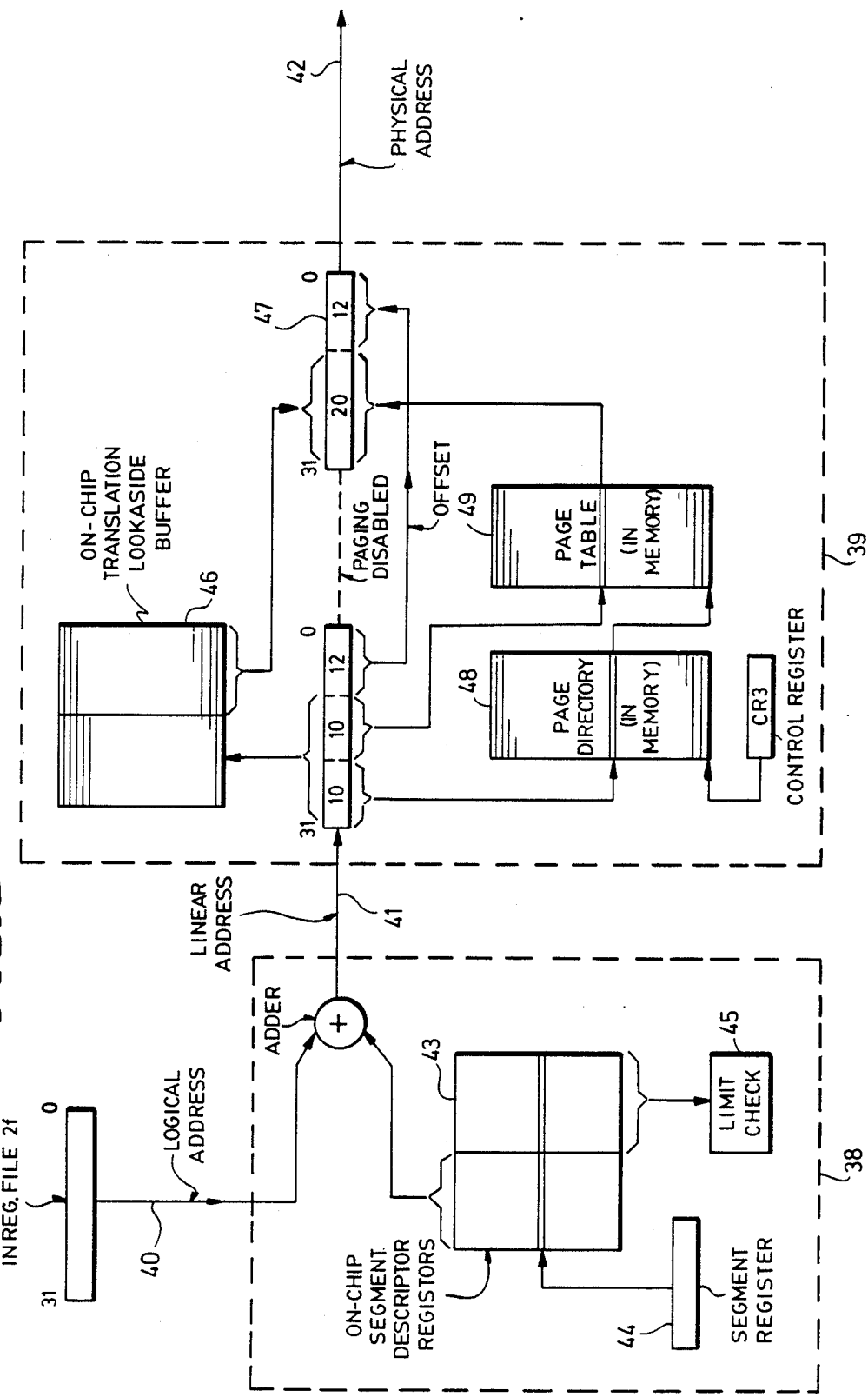
FIG. 3 is a schematic representation of the memory management scheme used in the CPU of FIG. 2.

The memory management unit 22 of the CPU 10 of FIG. 2 includes a segmentation unit 38 and a paging unit 39. A 32-bit logical address produced on bus 40 by the execution unit 20 is translated by the segmentation unit 38 into a 38-bit linear address on bus 41, and then translated into a 32-bit physical address on bus 42 by the paging unit 39. Referring to FIG. 3, the segmentation unit 38 adds the logical address on bus 40 to a base address from segment descriptor registers 43; one of the descriptor registers 43 is selected by the contents of a segment register 44. The segment discriptors contain not only the base address for the segment, but also the limits of the segment (its size) and the level of protection. The sum of the logical address on bus 40 and the base address for the segment, if the limit and attribute checker 45 in the segmentation unit finds the address to be proper, becomes the linear address on bus 41. If paging is disabled, this linear address passes through the paging unit 39 without change and becomes the physical address on bus 42. If paging is enabled, the linear address is first tested to see if the page address is found in a page cache 46 (a set associative translation lookaside buffer); bits 13-31 of the 32-bit linear address are compared to the thirty-two most recently used page addresses stored in the cache 46, and if a match is found the page address for this entry is forwarded to an adder 47 which produces the physical address on bus 42 using the page address and the lower 12-bit offset from the linear address. If the page is not found in the cache 46 (the hit rate is perhaps 98%), the page must be looked up in a page directory 48 and a page table 49 which are stored in memory 14. The upper 10-bit part of the 32-bit linear address is used to select 1-of-1024 entries in the page directory 48, producing the base address of the page table 49, then the next 10-bit part of the linear address is used to select 1-of-1024 of the entries of this page table, producing the translated page address used as an input to the adder 47 as before. The page entries have protection bits, similar to the segment entries, so several modes of protection are available. The segmentation and paging units 38 and 39 are used to translate addresses to memory 14, but not I/O addresses, however, so when the peripheral controller 11 is addressed to transfer commands or operands it is always at a fixed physical address in the I/O space.

The bus interface unit 23 includes an address driver 51 functioning to generate the 24-bit or 32-bit address on external bus 12a along with the byte-enable bits BE0–BE3 (for 80386 devices, not 80386SX) which are part of the control bus 12c. When a new valid address is driven onto the bus 12a, an address status line ADS# is asserted in the control bus 12c. The outgoing addresses may be pipelined if a next-address signal NA# is asserted in control bus 12c by an external device; instead of waiting until a Ready line is asserted to produce the next address, a pipeline control circuit 52 produces a new address every cycle from the driver 51 if it has received the NA# signal. All incoming and outgoing data is controlled by multiplexer/transceivers 53 connected to the external data bus 12b. Data to or from the execution unit 20 is coupled to the transceiver 53 via bus 54, or instruction stream data to fill the queue 36 is coupled from transceiver 53 via bus 35. Interrupts and bus arbitration are handled by a request prioritizer 55 which receives HLDA, INTR, NMI, ERROR# and BUSY# signals from the control bus 12c, and generates HOLD signals to the control bus 12c. Definitions of these control bus signals are contained in Table A.

The microprocessor of FIG. 2 is pipelined in that during a given machine cycle several instructions are executing at various stages at the same time. An instruction loaded to the prefetch queue 36 in one machine cycle will be decoded in the unit 37 in the next machine cycle, generating a microinstruction output from the control ROM 28 in a third cycle, causing the execution unit 20 to perform some operation in a fourth cycle, then the result is written to a register of the file 24 in a fifth cycle. Of course, execution of other instructions overlap this instruction.

In the embodiment of FIG. 1, the interface with the keyboard or auxiliary device uses a peripheral controller which is an Intel 8042 Universal Peripheral Interface, a microprocessor device commercially available from Intel Corporation. This controller is used to implement the interface between the host processor 10 and two external devices, namely an alphanumeric keyboard 57, and a mouse 58. The interface between the keyboard 57 and the microprocessor or controller 11 consists of lines 59 which include a serial data line and a single control line called TEST0 which is an input to the controller 11 indicating when the keyboard has data to send. Likewise, the interface between the mouse 58 and the microprocessor 11 consists of a similar set of lines including a serial data line and a TEST1 line which indicates when the mouse has data to send.

The peripheral interface microprocessor 11 has 8-bit data in and data-out registers, and certain control lines, connected to the shared system bus 13. The host processor 10 communicates with the keyboard 57 via an I/O port; that is, a specified address in the I/O address space of the processor 10 is reserved as a data port used for communication between the CPU 10 and with the keyboard 57. When the host processor 10 executes an I/O read or write instruction to the keyboard's I/O address, a decoder detects this address on the system address bus 13a and causes the microprocessor 11 to be selected and activated, sending or receiving commands or data on data bus 13b via the 8-bit data-in and data-out registers of the microprocessor 11. For example, the command from the host processor 10 which causes the microprocessor or controller 11 to enter "password lock mode" is issued via the data-in register. An applications program executed by the CPU 10 initially asks the user to select a password, and this password is stored by the CPU 10 in RAM, so thereafter upon entering a proper keycode sequence the user can place the system in lockout mode, at which time the CPU sends the command to the controller 11 via a data-in register.

Referring to FIG. 1, the keyboard 57 includes a key matrix 60 consisting of rows and columns of keyswitches 61. In a typical desktop computer there would be perhaps 101 keys on the keyboard. A keyboard controller device 62 performs the function of determining when a key is depressed and which key is depressed. The column lines of the matrix are connected to one set of ports 63 of the controller 62, and the row lines are connected to another port 64; a definition of which key is down is available from the row and column information at these ports 63 and 64. The controller 62 is a microprocessor device having a program stored in ROM or EPROM, like the controller 11; usually a microprocessor device such as commercially available under the part numbers 8051 or 8048, manufactured by Intel Corporation, is used for this controller 62. The stored program performs the function of scanning or polling the keyboard matrix 60 and generating an 8-bit keycode for each key as it is depressed. These keycodes are buffered in a 128-byte RAM within the controller 62, and are transferred to the peripheral controller 11 upon request, and thus to the CPU 10. The controller 62 generates a TEST0 input to the controller 11, then the controller 11 sends a command back to the controller 62 when ready to receive keycode data. The keyscan or polling thus goes on independently of and transparent to the CPU 10 and the peripheral controller 11, but when a key is depressed and a keycode is ready to be sent from the controller 62, the controller 11 and then the CPU 10 are in control of the transfer.

Figure 4:
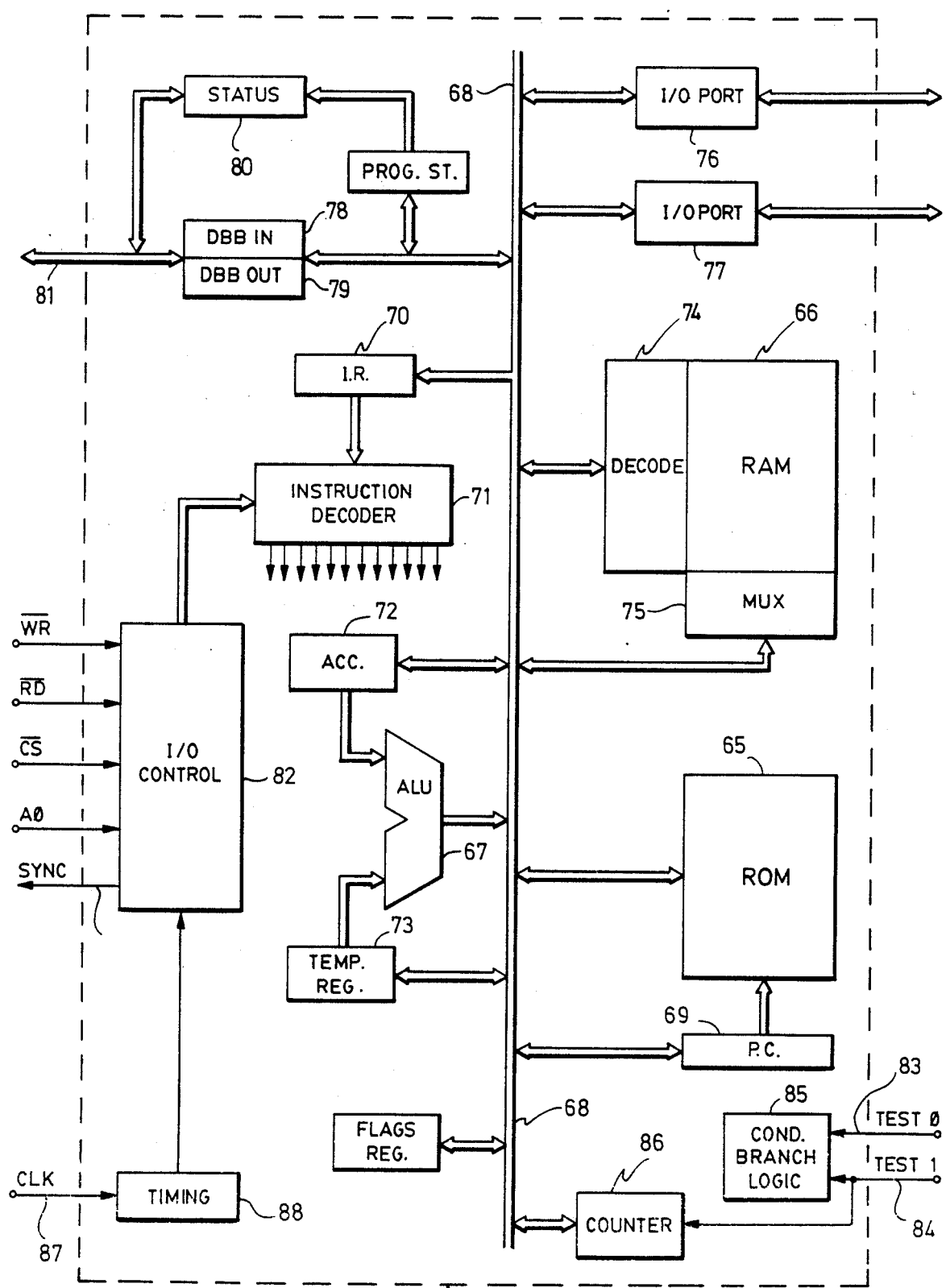
FIG. 4 is an electrical diagram in block form of internal details of a controller chip which may be used in the system of FIGS. 1 and 2.

Referring now to FIG. 4, the peripheral controller 11 is shown in more detail. This device is a processor executing instruction code stored in an internal ROM or EPROM 65 of about 1K- or 2K-byte, and has a 128- or 256-byte internal RAM 66, an 8-bit wide ALU 67 and an 8-bit internal bus 68. Instructions are fetched from ROM 65 using a program counter 69 for addressing, and loaded into an instruction register 70 then decoded by instruction decoder 71 which generates control signals to define the operation of the device. The two inputs of the ALU are loaded from an accumulator register 72 and a temporary register 73, both coupled to the internal bus 68. The RAM 66 contains a register file, stack and data storage, and is addressed by a decoder 74 and a multiplexer 75, also coupled to the internal bus 68. Two 8-bit I/O ports 76 and 77 connected to output terminals of the device are coupled to the internal bus 68, and are loaded and unloaded under instruction control. The interface to the CPU 10 uses a pair of data buffers 78 and 79 and a status register 80, all three of which are coupled to an 8-bit data I/O port 81 which is connected to the system data bus 13b. The data bus buffer registers 78 and 79, referred to as DBBOUT and DBBIN, are loaded or read by the controller 11 from the internal bus 68, by executing instructions from ROM 65; loading or reading these data bus buffers from the CPU 10 is controlled by lines of the control bus 13c connected to controller 82. These control lines include a writer control WR, a read control RD, chip select CS and address line A0, as defined below. The TEST0 and TEST1 input 83 and 84 to the chip are connected to conditional branch logic circuitry 85, which produces an input to the decode and control circuitry 71 and 82 when a conditional branch instruction is executed. The conditional branch logic 85 also receives inputs representing ALU operation such as carry, contents of accumulator 72 equal zero, etc., as well as the condition of the data bus input and output buffers 78 and 79. An 8-bit timer or event counter circuit 86 is connected to count clock cycles (divided by thirty-two), or to count external events by an input from the Test1 pin, and also produces an output to set a timer flag which is testable by the conditional branch logic 85 so that a branch instruction can be conditional upon overflow of the counter 86. Also, overflow of the counter 86 generates an interrupt by input to the decode and control circuitry 71, 82, which is enabled or disabled under program control. The counter register 86 may be loaded from or to the accumulator 72 via the internal bus 68. The processor 11 is synched to the host CPU 10 by clock inputs 87 to a timing circuit 88, and produces a synch output 89 to the keyboard controller 62, so both of these peripheral processors 11 and 62 are synched by inputs from the main processor 10. The controller 11 of FIG. 4 executes the instruction set of Table B (as well as other instructions not material to the present invention).

Figure 5:
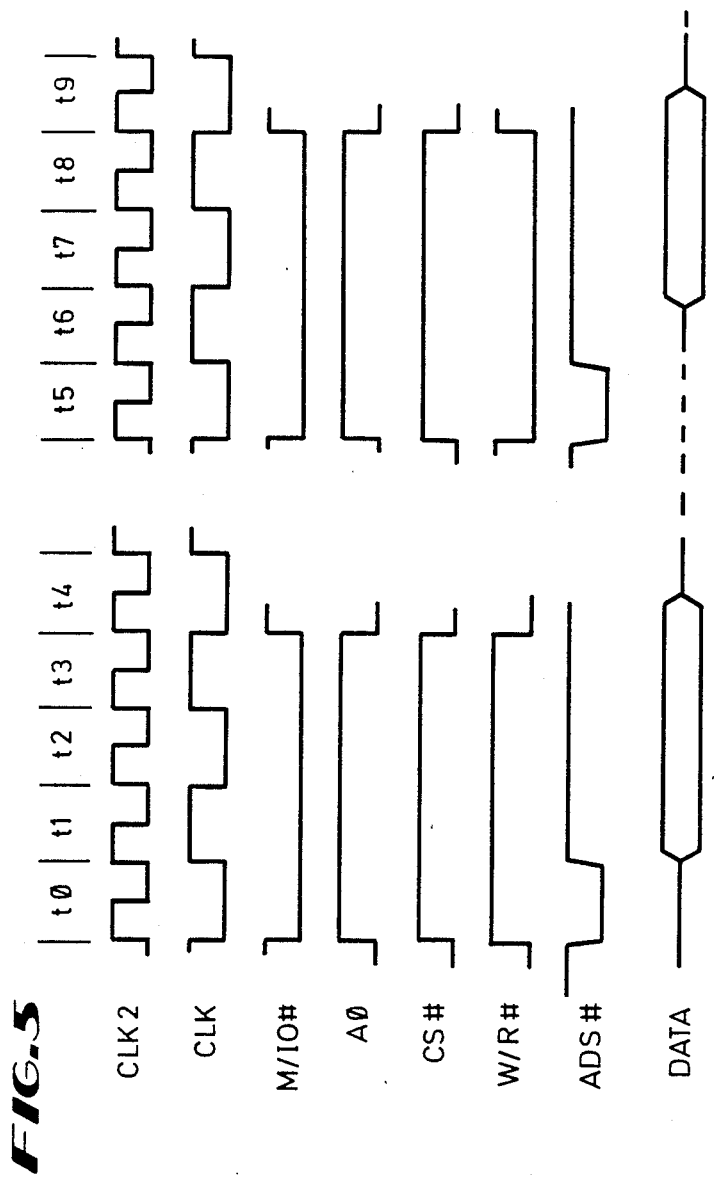
FIG. 5 is a timing diagram of voltage or events vs. time for read and write cycles performed by the CPU to access the controller 11 of FIGS. 1, 2 and 4.

Referring to FIG. 5, a bus cycle is illustrated in which the CPU 10 writes a command or data to the data input register 78 of the controller 11. During the first Clk cycle, t0, the address strobe ADS# is asserted on bus 12c by the CPU 10 along with the control signals M/IO# and W/R# indicating this to be a write to I/O space; A0 and certain other address bits are driven high by the CPU 10 on bus 12a and detected at an address decoder for the controller 11 at input CS#, indicating the address of the register 78 in I/O space. Data is driven onto bus 12b by the CPU 10 during the period t1-t2. Assuming the system bus is free, this write request is asserted or "posted" onto the system bus 13; the CPU 10 does not wait for any acknowledge that the write operation was completed, but instead continues with another cycle. Also shown in FIG. 5 is a read cycle, where the CPU performs a read of the I/O address where the data bus buffer 79 is defined to reside. During t5, the ADS#, M/IO#, A0, and chip select CS# are the same as for a write, but the W/R# signal on bus 12c is low, initiating a read operation. By external logic (not shown) the W/R# signal on control bus 12c and 13c is converted to separate W# and R# controls for the controller 11. Again, assuming the bus 13 is free, this read request is asserted onto bus 13 at the same time as it reaches bus 12. In t6, the I/O control 82 in the controller 11 recognizes the read request and drives the data onto the output 81 during t7 and t8. The logic circuit which generates the separate R# and W# controls also generates a Ready# response to the CPU 10, since the controller 11 does not produce this signal.

Figure 6:
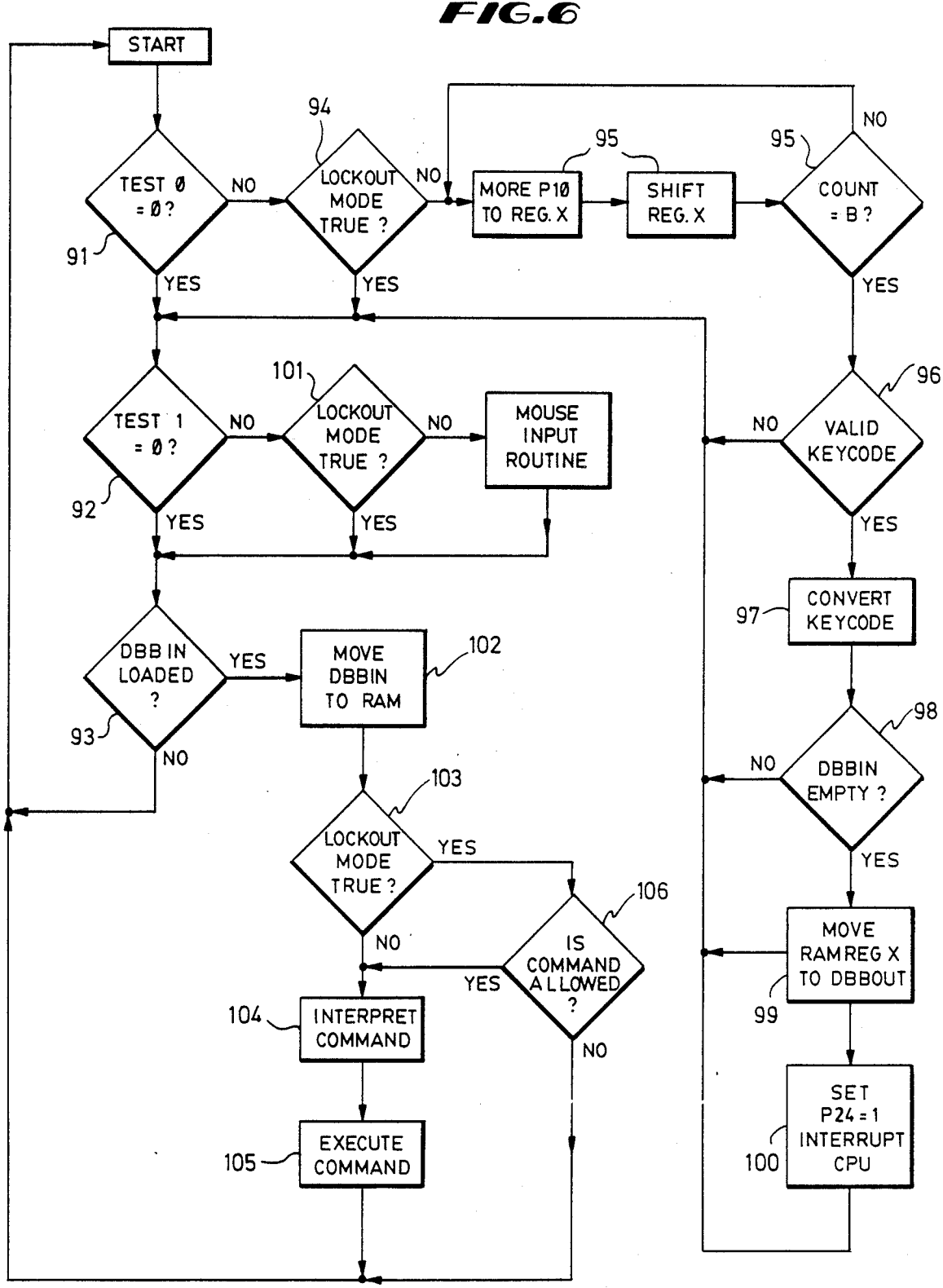
FIG. 6 is a logic flow chart of a program for keyboard input and keyboard lock-out in the system of FIGS. 1-4 according to an embodiment of the invention.

Referring to FIG. 6, a logic flow chart, in simplified form, of a part of an example of a program which may be stored in the ROM 65 and executed by the controller 11 is illustrated. In an idle state, the controller 11 polls the TEST0 and TEST1 inputs 83 and 84 and the status register 80 in a loop to see if there is a keyboard or other auxillary device (such as a pointing device, typically a mouse) input, or if the CPU 10 has written to the data bus input buffer 79, as represented by the decision points 91, 92 and 93 of the flow chart; this loop is implemented using the instruction set of Table B, in known manner. If the TEST0 input is active at point 91, the program checks to see if the lock-out mode is activated at decision point 94, and if yes the sequence returns to the original loop at point 92, since the keyboard is to be ignored. If lock-out is not activated, then the controller 11 enters a loop where it reads its port P10 (one bit of the ports 76 and 77) for a count of eight and loads and shifts these bits to a register of RAM 66 as represented by the elements 95 of the flow chart. A table look-up is performed at point 96 to see if the 8-bit word read in is a valid key code; if not, the original polling loop is re-entered, or if so then a code conversion is done at point 97 to produce the key codes used by the CPU 10, and the status of the data bus output buffer 79 is checked at point 98, and if empty this buffer 79 is loaded at point 99, and port terminal P24 (of I/O ports 76, 77) is set at point 100 to produce an interrupt INTR input to the CPU 10, by way of a standard interrupt controller chip, not shown. This interrupt will cause the CPU 10 to enter a routine to read the buffer 79 using a cycle as in FIG. 5. Although not illustrated here, the controller 11 can buffer several key codes in RAM 66 if the CPU 10 does not immediately respond to the interrupt; in some cases the CPU program will mask the keyboard interrupt while another task is being performed, e.g., refresh of the DRAM chips of main memory. After signalling the interrupt, the controller 11 returns to the polling loop at point 91. The polling loop has a similar input routine for the mouse input TEST1 as indicated at points 92 and 101. Data input to buffer 78 is found by checking status at point 93, and if true then at point 102 the data is moved to RAM 66 and the status of the lock-out mode is checked at point 103; if not in lock-out mode then the data is interpreted to see what action is needed as indicated by point 104, so if the input from the CPU 10 is a command then the required action is taken before return to the polling loop at point 105. If in lock-out mode, however, the input word is checked at point 106 to see if it is an allowed activity in lock-out. If not, the input is ignored and the polling loop is re-entered at 105; if so then the usual interpretation and execution are performed.

Whenever a command is sent to the controller 11 via its I/O data buffer 78, the controller program will respond by sending either an "acknowledge" code (ACK) or a "resend" code (RESEND) to the CPU via buffer 79, and possibly more data, depending on the command that was sent. When in the conventional "password lock mode", however, the controller 11 would not respond to any command, nor would it allow any communication to or from the keyboard 57 or mouse 58. Such complete disabling of auxiliary device communication prevented application software running on a computer in "password lock mode" from determining what type of keyboard or auxiliary devices were attached, or even whether the keyboard or auxiliary devices were present or functioning properly.

With the keyboard/auxiliary device controller of the present invention, however, the following classifications of information transfer are allowed, even when the computer is in "password lock mode":

—commands from the host processor 10 to the interface controller 11;
—commands from the host processor 10 to the keyboard 57 via the interface controller 11;
—commands from the host processor 10 to the auxiliary device 58 via the interface controller 11;
—solicited responses (only) from the microprocessor or controller 11 to host processor 10;
—solicited responses (only) from the keyboard 57 to the host processor 10 via the interface controller 11; or
—solicited responses (only) from the auxiliary device 58 to the host processor 10 via the interface controller 11.

In the preceding list, which is implemented in a table in the ROM 65 reference at point 106 of the flow chart of FIG. 6, notice that unsolicited or user-initiated information transfer from the keyboard 57, auxiliary device 58, or the processor 11 are not permitted when "password lock mode" has been enabled. By limiting the transfer of information to the classes listed above, user interaction with the system 10 is restricted as in conventional "password lock mode", while internal system activity can proceed as if "password lock mode" were not enabled.

A keyboard/auxiliary device controller with functions in accordance with features of the present invention is defined by the machine-language code stored in the internal one- or two-kilobyte ROM or EPROM memory 65 of the microprocessor 11. These features reflect modifications of the code which has previously been used for keyboard functions in systems using the hardware elements of FIGS. 1, 2 and 4. The features can be grouped into three general areas: (1) modifications to the support of controller 11 commands sent from the host processor 10, (2) modifications to the support of communication between the controller 11 and the keyboard 57, and (3) modifications to the support of communication between the controller 11 and the mouse 58.

(1) Modifications to controller 11 command support: According to one embodiment of the present invention, commands sent from the host processor 10 to the controller 11 operating in the improved "password lock mode" are executed exactly as they would be when the controller 11 is not operating in "password lock mode", with the following exceptions:

(a) —LOAD PASSWORD COMMAND: If the controller 11 is already operating in "password lock mode", the loading of another password is not permitted. Issuance of this command by the host processor 10 is typically followed by the transfer of password bytes from the processor 10 to the controller 11. In "password lock mode", however, these bytes are transferred from the CPU 10 to the controller 11 and acknowledged by the controller 11, but then discarded, i.e., not used to overwrite the password bytes already in the RAM 66.

(b) —ENABLE SECURITY COMMAND: If the controller 11 is already operating in "password lock mode", re-entering this mode is not useful and is therefore not permitted.

(c) —AUXILIARY DEVICE AND KEYBOARD INTERFACE TEST COMMANDS: Since the auxiliary device (mouse) 58 and keyboard 57 are effectively disabled when the controller 11 is operating in "password lock mode", issuance of either the Auxiliary Device Test or Keyboard Test Command causes a code to be returned to the host processor 10 which indicates that the tests have passed successfully, even though no such test is made, so the host processor 10 will not hang up by waiting indefinitely for a response.

(2) Modifications to support of communication with the keyboard 57:

As noted above, the keyboard is accessed by the host processor via I/O reads and writes to the address reserved as the keyboard I/O port. According to the example embodiment of the present invention, commands can be issued by the CPU 10 to the keyboard 57 (via controller 11), and corresponding responses are returned to the host processor 10, but keystrokes typed on the keyboard 57 are not transferred via controller 11 to the host processor 10. This is accomplished by providing the controller 11 with information (in its ROM code) regarding the keyboard command structure, so that only the correct number of response bytes are permitted to be transferred from the keyboard 57 through the controller 11 to the host processor 10. This is done by testing input commands against a table of permitted commands. Furthermore, a time limit is placed on the response from the keyboard, and no additional bytes are passed after this time. The following examples illustrate how these techniques are used to prevent user-initiated information transfer between the keyboard 57 and the host processor 10:

(a) —READ KEYBOARD ID COMMAND: The controller 11 excepts a three-byte response from the keyboard 57 when this command is issued by the host processor 10: the ACK byte, followed by $(AB), followed by $(83). No more than three bytes are permitted to be transferred to the host processor 10 after issuance of this command.

(b) —RESET KEYBOARD COMMAND: The controller 11 expects a two-byte response from the keyboard 57 when this command is issued by the host processor 10. Since resetting the keyboard 57 can take up to one second, (longer than the typical response time limit accepted by the controller 11), the controller 11 will wait for an appropriate amount of time for this response.

(c) —SELECT MODE COMMAND: This command is issued in two bytes, and can be used in two different ways. The host processor 10 can issue this command to the controller 11 to cause the keyboard 57 to enter one of three different operating modes, or it can issue this command to determine which mode the keyboard is currently in. When the controller 11 receives the first byte of a SELECT MODE command destined for the keyboard 57, it forwards the byte to the keyboard 57, then waits for the second byte of the command. If this second byte is a zero, indicating a mode query, then the controller 11 expects and permits a two-byte response, consisting of an ACK byte, and a current mode byte. If the next command byte is non-zero, however, indicating a "change mode command", then only one response byte, an ACK byte, is expected and permitted.

All other commands issued by the processor 10 to the keyboard 57 are assumed to have a one-byte response, and the controller 11 permits only a single byte to be transferred from the keyboard 57 to the processor 10, and only if it is sent within the required time limit. Otherwise, the controller 11 generates an error byte to the host processor 10 as it would in "non-password lock mode".

(3) Modifications to support of communication with auxiliary device: Like the keyboard 57, the auxiliary device 58 can response with either an ACK or RESEND byte for each command sent to it. The number of additional response bytes sent from the auxiliary device 58, however, cannot be predicted as with the keyboard responses, since a variety of auxiliary devices may be attached to the controller 11. In order to allow communication with the auxiliary device 58, yet not allow the device to initiate the communication on its own, the controller 11 depends upon the "packetization" of responses from the auxiliary device. When a command is issued to the auxiliary device 58 from the host processor 10, the controller 11 is programmed to expect the response bytes to be sent continuously until the auxiliary device 58 has completely replied to the command. The "packet" of response bytes is thus accepted by the controller 11 until a pause is encountered, at which time the controller 11 stops allowing bytes to be transferred to the host processor 10. In this embodiment of the invention, a pause is defined as an interval of perhaps about a millisecond in which no bytes are sent from the auxiliary device. As with the KEYBOARD RESET COMMAND, the AUXILIARY RESET COMMAND can require additional time (up to several seconds, for example) before making a response. The controller 11 accordingly waits an appropriate amount of time for responses from AUXILIARY RESET commands, although any other command to the auxiliary device 58 is allotted the normal command response timeout interval in which to make responses. After this interval, the controller 11 stops accepting response bytes, and generates an error code to the host processor, as it would if "password lock mode" were not enabled.

The modified behavior of the peripheral controller 11 is realized, as noted above, by changing the ROM-based code in the controller 11 itself. No additional variation from the conventional hardware implementation of keyboard/auxiliary device is necessary in order to realize a controller 11 which conforms to the above-described embodiment of the present invention. Alternate or additional command/response patterns for the keyboard or for various auxiliary devices ROM-based code for the controller 11 may be employed; the foregoing are merely examples.

From the above detailed description of a specific embodiment of the present invention, it will be evident that improvements to the conventionally used keyboard/auxiliary device controller have been disclosed which provide for restriction of user interaction with a computer system while simultaneously maintaining non-interference with certain internal system activities which require communication through a controller in "password lock mode".

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

TABLE A—CONTROL BUS

M/IO#, D/C#, W/R# and LOCK# are cycle definition signals, setting forth the type of cycle the CPU 10 is executing on the bus 12. M/IO# selects a memory reference if high, or an I/O reference if low. D/C# says whether the access is for data (if high) or for code (if low); this signal can be used to differentiate between accessing instructions and accessing data. W/R# is the write/read control, specifying a write operation if high or a read operation if low. Lock# forces a condition where the CPU 10 maintains control of the bus 12 and cannot be interrupted by another master.

ADS# is an address status signal, and indicates that new address and cycle definition information is available on the bus 12a and 12c; this signal begins every external access by the CPU 10.

READY# is a transfer acknowledge input to the CPU and terminates a cycle on the local bus 12 by signalling to the CPU 10 for a read cycle that the data on the bus 12b is ready to be latched into the CPU or that a write has been completed or posted. Every CPU bus cycle must end with READY# asserted.

NA# is the next-address request, used to initiate address pipelining by indicating that the system is prepared to accept new values of address, byte enable, and cycle definition, even if the end of the current cycle has not been acknowledged on READY#.

HOLD AND HLDA are bus arbitration signals, where HOLD is asserted as an input to the CPU 10 when another device requires control of the bus, and the CPU 10 asserts hold-acknowledge HLDA when it relinquishes control of the bus in response to HOLD.

INTR is a maskable interrupt request input to the CPU, and when asserted the CPU executes an interrupt acknowledge cycle in which an interrupt vector is latched into the CPU from the data bus 12b.

Clock Clk2 is the same clock for both the CPU 10 and the controller 11, and is divided by two internally to produce the internal clock Clk. In the example, the Clk frequency is perhaps 20-MHz, so the Clk2 frequency is 40-MHz.

BE0#—BE3# are Byte Enable signals defining which ones of the four bytes in the 32-bit doubleword on data bus 12b being accessed are wanted by the CPU 10. These signals are used in the 80386, but not in the 80386SX.

TABLE B—The Instruction Set:

The controller 11 of FIG. 4 executes the following instruction set: ADD: There are three types of ADD instructions—ADD A,Rr=add one of the registers Rr of the register set in the RAM 66 to the contents of A, the accumulator 72; ADD A,@Rr=add the contents of a location in the data memory part of the RAM 66 selected by register Rr to contents of the accumulator 72; ADD A,#data=add an immediate value in the instruction itself to the contents of the accumulator 72.

All three of these ADD instructions also can be with a carry when the mnemonic is ADDC.

ANL: There are three types of AND instructions, like the ADD instructions—ANL A,Rr=perform an "AND" function of a register Rr with the contents of the accumulator 72, result to accumulator; ANL A,@Rr=same for a data memory location, and ANL A,#data=same for immediate value.

ORL: Again, three types of OR instructions—ORL A,Rr=OR the contents of a register with the contents of the accumulator, result to accumulator; ORL A,@Rr=same for a data memory location, and ORL A,#data=same for an immediate value.

XRL: Exclusive OR instructions are of three types just like the ORL instructions—XRL A,Rr=Register, XRL A,@Rr=data memory, and XRL A,#data=immediate.

INC A: Increment the accumulator 72. Also, INC Rr is increment the register Rr, and INC @ Rr is increment the data memory location pointed to by the contents of register Rr.

DEC A: Decrement the accumulator 72. Likewise, DEC Rr is decrement the register Rr.

CLR A: Clear the accumulator 72.

CPL A: Complement the accumulator.

SWAP A: Swap 4-bit nibbles contained in accumulator.

RL A: Rotate accumulator left; also there are rotate right, and rotate left and right through carry, instructions.

IN A,Pp: Input Pp, a selected one of the ports 76 or 77, to A, the accumulator 72.

OUT A,Pp: Output the accumulator A to a selected one of the ports 76 or 77, Pp.

ANL Pp,#data: Perform an AND function between immediate data and a selected one of the ports 76 or 77, result to the port.

ORL Pp,#data: Perform an OR function between immediate data and a selected one of the ports 76 or 77, result to the port.

IN A,DBB: Input the data bus buffer 79 to the accumulator 72 and clear the input buffer flag IBF in register 80.

OUT DBB,A: Output the contents of the accumulator 72 to the data bus buffer 78 and set the output buffer flag OBF.

MOV STS,A: Move the contents of bits 4–7 of the accumulator to bits 4–7 of the status register 80.

MOV A,Rr: Move the contents of register Rr of the RAM 66 to the accumulator 72. MOV Rr,A is the reverse.

MOV A,@Rr: Move the contents of the data memory 66 as addressed by the contents of register Rr to the accumulator. Similarly, MOV @Rr,A is the reverse.

MOV A,#data: Move the immediate data in the instruction to the accumulator.

MOV Rr,#data: Move immediate data to register Rr.

MOV @Rr,#data: More immediate data to memory location.

MOV A,PSW: Move immediate data to program status word. The reverse is provided by the MOV PSW,A instruction.

XCH A,Rr: Exchange the accumulator with the register Rr.

XCH A,@Rr: Exchange the accumulator with the memory location which is addressed by the contents of Rr.

MOVP A,@A: Move the contents of the location in the current page of ROM 65 addressed by the contents of the accumulator to the accumulator.

MOVP3 A,@A: Same as MOVP but uses page-3 of ROM instead of current page.

MOV A,T: Read the contents of the timer/counter register 86, load to accumulator.

MOV T,A: Load the contents of the accumulator to the timer/counter register 86.

STRT: Start timer 86, counting clock cycles/32.

STRT CNT: Start counter register 86 counting inputs to Test1 pin 84.

STOP TCNT: Stop timer or counter.

EN I and DIS I: Enable and Disable the input buffer full IBF interrupt (not used in this example).

SEL RB0: Select register bank 0, bytes 0-7 of RAM 66 are used as registers 0-7.

SEL RB1: Select register band 1, bytes 24–31 of RAM 66 are used as registers. 0-7.

NOP: No operation.

CALL addr: Jump to subroutine starting at address "addr" in the ROM 65.

RET: Return to instruction following last CALL.

RETR: Return and restore status.

CLR C: Clear the carry flag. Similarly, CLR F0 is clear flag-0 and CLR F1 is clear flag-1.

CPL C: Complement the carry flag. Similarly CPL F0 or CLR F1 means clear the flag-0 or flag-1.

JMP addr: Jump unconditionally to the address "addr" in ROM 65. Similarly, JMPP @A is jump indirect, jump unconditionally to address contained in accumulator.

JC addr: conditional jump on carry=1. Similarly, JNC addr is jump to address "addr" in ROM 65 if carry=0.

JZ addr: conditional jump to address "addr" in ROM 65 if accumulator contents are zero. "JNZ addr" means same, but if accumulator content is not zero.

JT0 addr: Jump to address "addr" if Test0=1.

JNT0 addr: Jump to address "addr" if Test0=0.

JT1 addr: Jump to address "addr" if Test1=1.

JNT1 addr: Jump to address "addr" if Test1=0.

JF0 addr: Jump to address "addr" if F0 flag=1.

JF1 addr: Jump to address "addr" if F1 flag=1.

JTF addr: Jump to address "addr" if timer flag=1

JNIBF addr: Jump to address "addr" if IBF flag=0, input buffer 79 is empty.

JOBF addr: Jump to address "addr" if OBF=1, output buffer 78 has been loaded.

What is claimed is:

1. A method of operating a computer system of the type having a CPU and memory associated therewith and a peripheral controller device coupled to said CPU, comprising the steps of:
   (a) switching said peripheral controller device between
      (i) a normal operating mode wherein said peripheral controller device sends unsolicted information to said CPU and said CPU sends unsolicited information to said peripheral controller device without reference to password data, and
      (ii) a lock-out mode wherein said peripheral controller device cannot send information to said CPU unless password data previously stored in said memory associated with said CPU is first entered to cause a switch back to said normal operating mode, but said CPU can send information to said peripheral controller device;

(b) monitoring unsolicited information transferred from said CPU to said peripheral controller device when said peripheral controller device is in said lock-out mode, and selectively allowing only preselected information transferred to said peripheral controller device by said CPU to activate said peripheral controller device for selected functions without switching from said lock-out mode.

2. A method according to claim 1 wherein said peripheral controller device includes a peripheral control processor and a keyboard coupled to said peripheral control processor.

3. A method according to claim 2 wherein said keyboard includes a keyboard control processor.

4. A method according to claim 1 wherein said selected functions include transfer of preselected bytes of information from said peripheral controller device to said CPU.

5. A method according to claim 1 wherein said peripheral controller device includes a keyboard and said keyboard cannot send any information created by manual activation of the keyboard to the CPU when in said lockout mode.

6. A method according to claim 1 wherein said system includes at least two peripheral input devices coupled to said CPU through said peripheral controller device.

7. A method according to claim 6 wherein said two peripheral input devices are a keyboard and a hand-operated "mouse" device.

8. A method according to claim 1 wherein said step of monitoring includes detecting when said CPU sends a request to said controller device when in said lock-out mode and allowing response information to be sent by the controller device to said CPU until a delay occurs in said response information then preventing any further information from being sent to the CPU.

9. A method of operating a computer system of the type having a CPU and memory associated therewith, and having a peripheral controller coupling a peripheral device to said CPU, comprising the steps of:
 (a) switching said peripheral controller between a normal operating mode wherein said peripheral device exchanges unsolicited commands and data with said CPU without reference to password data, and a lock-out mode wherein said peripheral device cannot send commands and data to said CPU until password data has been entered to cause a switch back to said normal operating mode;
 (b) monitoring unsolicited commands and data transferred from said CPU to said peripheral controller for transfer to said peripheral device when said peripheral controller is in said lock-out mode, and selectively allowing only preselected commands and data to be transferred to said CPU from said peripheral device in response to requests from said CPU directed to said peripheral device.

10. A method according to claim 9 wherein said system includes two of said peripheral devices coupled to said CPU through said peripheral controller.

11. A method according to claim 10 wherein said two peripheral devices are a keyboard and a hand-operated "mouse" device.

12. A method according to claim 9 wherein said step of monitoring includes counting bytes of data being transferred and detecting said preselected commands.

13. A method according to claim 9 wherein said step of monitoring includes detecting the time delay between bytes of said preselected commands or data being coupled from said peripheral device to said CPU and halting any coupling when a given delay is detected.

14. A computer system comprising:
 (a) a CPU accessing memory via a system bus, and executing instructions fetched from said memory to perform operations on data stored in and recalled from said memory;
 (b) a peripheral controller device coupled to said system bus and accessed by said CPU, the peripheral controller transferring data and commands to and from said CPU according to a control sequence;
 (c) at least one peripheral device coupled to said peripheral controller, said peripheral device generating data and commands for transferring to said CPU via said peripheral controller;
 (d) said control sequence including a lock-out mode preventing said peripheral controller from transferring said data and commands from said peripheral device to said CPU but allowing said CPU to transfer selected commands from the CPU to the peripheral device.

15. A system according to claim 14 wherein said peripheral controller is a microprocessor executing instructions stored in local memory for said controller.

16. A system according to claim 15 wherein said at least one peripheral device includes a keyboard.

17. A system according to claim 16 wherein said selected commands include a status inquiry command.

18. A system according to claim 14 wherein said at least one peripheral device includes a keyboard device and a hand-operated "mouse" input device.

19. A system according to claim 18 wherein selected commands include status inquiry commands from said CPU to said "mouse" device requiring response by said mouse device to said CPU.

20. A system according to claim 19 wherein said control sequence includes detecting the time between bytes of said response and preventing any further bytes after a selected time delay has occurred between bytes, to thereby block any manually-generated response.

* * * * *